United States Patent [19]

Porter et al.

[11] Patent Number: 4,488,917

[45] Date of Patent: Dec. 18, 1984

[54] METHOD FOR MAKING CEMENT BOARD

[75] Inventors: Michael J. Porter; Richard E. Galer, both of Hanover Park, Ill.

[73] Assignee: United States Gypsum Company, Chicago, Ill.

[21] Appl. No.: 516,916

[22] Filed: Jul. 25, 1983

[51] Int. Cl.[3] .............................................. B32B 31/12

[52] U.S. Cl. ...................................... 156/39; 118/123; 156/346; 425/122; 427/356; 428/703

[58] Field of Search ....................... 156/39, 41, 42, 44, 156/45, 346, 347; 118/100, 106, 170, 315, 323, 123; 425/110, 122, 361, 364 R, 366; 264/112, 113, 257, 263, 271.1, 273; 198/364, 635, 637; 428/247, 703; 427/356

[56] References Cited

U.S. PATENT DOCUMENTS

| | | | |
|---|---|---|---|
| 1,511,500 | 10/1924 | Brookby | 428/703 X |
| 1,750,621 | 3/1930 | Brookby | 156/347 X |
| 2,577,476 | 12/1951 | Nashley | 154/124 |
| 2,728,238 | 12/1955 | Paasche | 74/99 |
| 3,072,095 | 1/1963 | Keesen et al. | 118/6 |
| 4,159,361 | 6/1979 | Schupack | 428/240 |
| 4,203,788 | 5/1980 | Clear | 156/44 |
| 4,213,525 | 7/1980 | Scheppele | 198/364 |
| 4,288,263 | 9/1981 | Delcoigne et al. | 156/42 |
| 4,381,734 | 5/1983 | Patz et al. | 119/52 B |

OTHER PUBLICATIONS

Morgen Company, Mar. 20, 1967, (Advertisement).

*Primary Examiner*—Robert Dawson

*Attorney, Agent, or Firm*—Robert M. Didrick; Samuel Kurlandsky; Robert H. Robinson

[57] ABSTRACT

Mortar is deflected continuously onto a moving carrier sheet from a distributor belt which is moving transversely to the carrier sheet by a plow which shuttles across the length of the distributor belt. An uninterrupted flow of mortar is spread across the sheet. The layer of mortar on the carrier sheet is slightly undulatory in the machine direction but a lateral cross section has a substantially uniform thickness so that a flat broad ribbon of mortar emerges from under a screed downstream from the shuttle plow.

3 Claims, 2 Drawing Figures

METHOD FOR MAKING CEMENT BOARD

This invention relates to the continuous production of cementitious panels. More particularly, it relates to a system for casting a hydraulic cement mixture in the form of a thin, indefinitely long panel. Still more particularly, it relates to a method and an apparatus for the continuous, uniform deposition of such a mixture across the breadth of a moving support surface at the initial stage of such casting.

The hydraulic cement mixture comprises water and at least one inorganic cementitious material which sets upon hydration, as exemplified by a calcined gypsum or a portland cement. The mixture may contain sand, mineral or non-mineral aggregate, fly ash, accelerators, plasticizers, foaming agent and other admixtures.

A substantially uniform thickness across the length and breadth of such panels is essential for their use in side-by-side array on walls, ceilings, or floors. Control of the thickness by means of screeds is limited by the flow properties of the hydraulic cement mixture. Mortars are usually thixotropic but often do not yield quickly enough to a screed laid across a fast moving conveyor belt to be spread evenly. Aggregate-filled mortars, especially those having a low water to cement ratio, are particularly resistant to flow. Irregularity in the amount of such mortars deposited on a fast moving conveyor belt tends to cause unevenness in the so-called "cement boards" and other building panels manufactured on high speed production lines.

Building panels are made commonly in widths of from 30 to 48 inches (11.8 to 18.9 cm). The wider the panel, the more difficult is the problem of even distribution of the mortar. The discharge of a cementitious paste or mortar onto a moving support surface directly from a continuous mixer would present a continuous ridge of rather immobile material to a downstream screed. The spread of a paste or mortar deposited by a distribution chute or feeder conveyor is determined in large part by the width of such distribution means. Such means could be as wide as the desired panel but unless the discharge port of the mixer is equally wide, which is impractical, the distribution means, even when vibrated, cannot be relied upon to deposit a layer of uniform thickness on the panel-supporting conveyor belt.

In U.S. Pat. No. 4,203,788, the patentee, Clear, teaches an apparatus for making cementitious panels which comprises a storage hopper from which a cementitious mixture is fed onto a moving dispenser belt which transfers the mixture through an adjustable metering gate onto a panel-supporting conveyor belt placed below but in line with the dispenser belt. The hopper is a reservoir which may be replenished continuously with fresh mixture but stagnant zones of the cementitious mixture may form along the walls of the hopper and around the metering gate. Setting of the mixture in these places restricts the flow of the mixture during panel manufacture and causes uneconomically long down time for scraping and chipping the set material from the apparatus.

U.S. Pat. No. 4,288,263 (Delcoigne et al) teaches a method and an apparatus for preventing the stagnation and consequent setting of liquid mixtures of water and plaster or cement in a bottomless reservoir which feeds the mixture through a slot onto a panel-supporting conveyor belt. The reservoir is filled and continuously replenished by the countercurrent introduction of the liquid mixture through nozzles arrayed horizontally along the downstream wall of the reservoir. Delcoigne et al teaches that the fresh streams of the mixture come into the reservoir with such force as to eliminate dead spots and prevent premature hardening of the mixture. The liquid consistency of the mixture is emphasized throughout the patent and it leaves unsolved the problems of flow resistance and localized premature setting of relatively stiff cementitious mixtures.

In U.S. Pat. No. 4,159,361, Schupack teaches an apparatus for forming cementitious panels, the apparatus comprising a forming table and a fabrication train which reciprocates longitudinally over the table. The panel is made by moving the fabrication train, which includes a mortar-depositing hopper and a laterally oscillating screed bar, over the table. As the layer of mortar is deposited longitudinally, it is smoothed by the screed bar as it moves back and forth across the breadth of the table. Thus, instead of depositing the cementitious mixture onto a moving conveyor belt to form an indefinitely long, broad ribbon of mortar, the mixture is laid onto a stationary table by moving the hopper and screed bar at right angles to each other. The length and width of the panel are limited by the length of the forming table and the width of the hopper's outlet. The casting of a stack of panels as taught by Schupack is necessarily an intermittent process because the mortar in each panel must have reached the initial set stage before another panel may be cast on top of it.

It is, therefore, an object of this invention to provide a novel method for the continuous deposition of a uniform head of mortar in the forming section of a building board production line.

Another object of this invention is to provide a novel apparatus and a system whereby a building board of uniform cross-section is produced continuously.

Another object of this invention is to provide a novel method for the distribution of a quick setting, stiff mortar in the forming section of a building board production line by which localized stagnation of the mortar and consequent setting thereof in the distribution system is avoided.

Still another object of this invention is to provide a novel method to facilitate control of the thickness of a cementitious building board on a continuous production line whereby uniformity is achieved.

Briefly, the invention includes a method and an apparatus for the uniform distribution of a viscous cementitious mixture over the breadth of an indefinitely long, continuous substrate as the substrate is being towed toward a screed suspended across the path of the substrate. The mixture, hereinafter called the mortar, is discharged from a continuous mixer directly onto an endless distributor belt which is mounted above and transversely to the substrate. As the mortar moves with the distributor belt, it is deflected continuously onto the moving substrate by a plow which shuttles across the length of the distributor belt at a constant plow speed which is less than the velocity of the moving distributor belt. The lower edge of the shuttle plow blade is in constant contact with the surface of the distributor belt and its face is in constant contact with a fresh ribbon of mortar coming from the mixer. An uninterrupted flow or mortar is spread across the moving sheet by this method.

A fuller understanding of the method and the apparatus by which the objects of this invention are achieved will be gained by reference to the drawings and the following detailed description thereof.

In said drawings.

Figure 1:
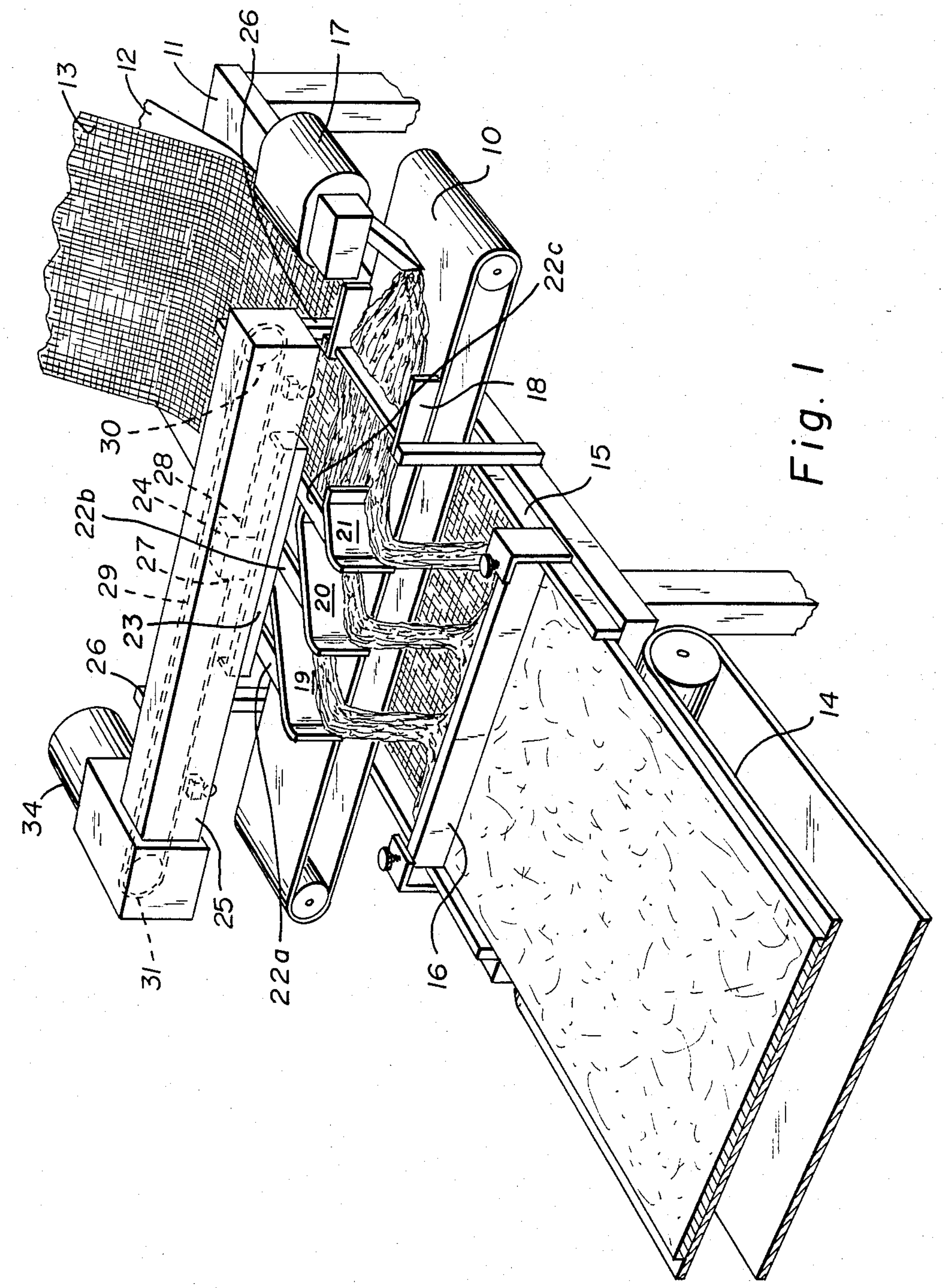
FIG. 1 is a perspective view of the mortar distribution system of this invention.

In FIG. 1, the distributor belt 10 is an endless conveyor belt driven by conventional drive means, not shown, and is mounted above and transversely to the forming table 11. A carrier sheet 12 and a reinforcing fiber scrim 13, each of continuous, indefinite length, are towed along the surface of the table 11 by the conveyor belt 14. The side rails 15 rest on the table 11 at each side of the sheet 12 and a screed 16 straddles the sheet 12 at a desired height. Mortar is deposited at the head of the belt 10 from a continuous mixer 17 and is spread and leveled by the spreader 18 which is mounted on legs. Shuttle plows 19, 20 and 21 are attached by the struts *22a*, *22b*, and *22c* to the stringer 23, which, in turn, is connected to the support 24 which is suspended within a box-beam 25 mounted on the posts 26. Two opposing ends 27 and 28 of the chain 29 are attached to the support 24 and the chain 29 is looped around the idler sprocket 30 and the drive sprocket 31.

Figure 2:
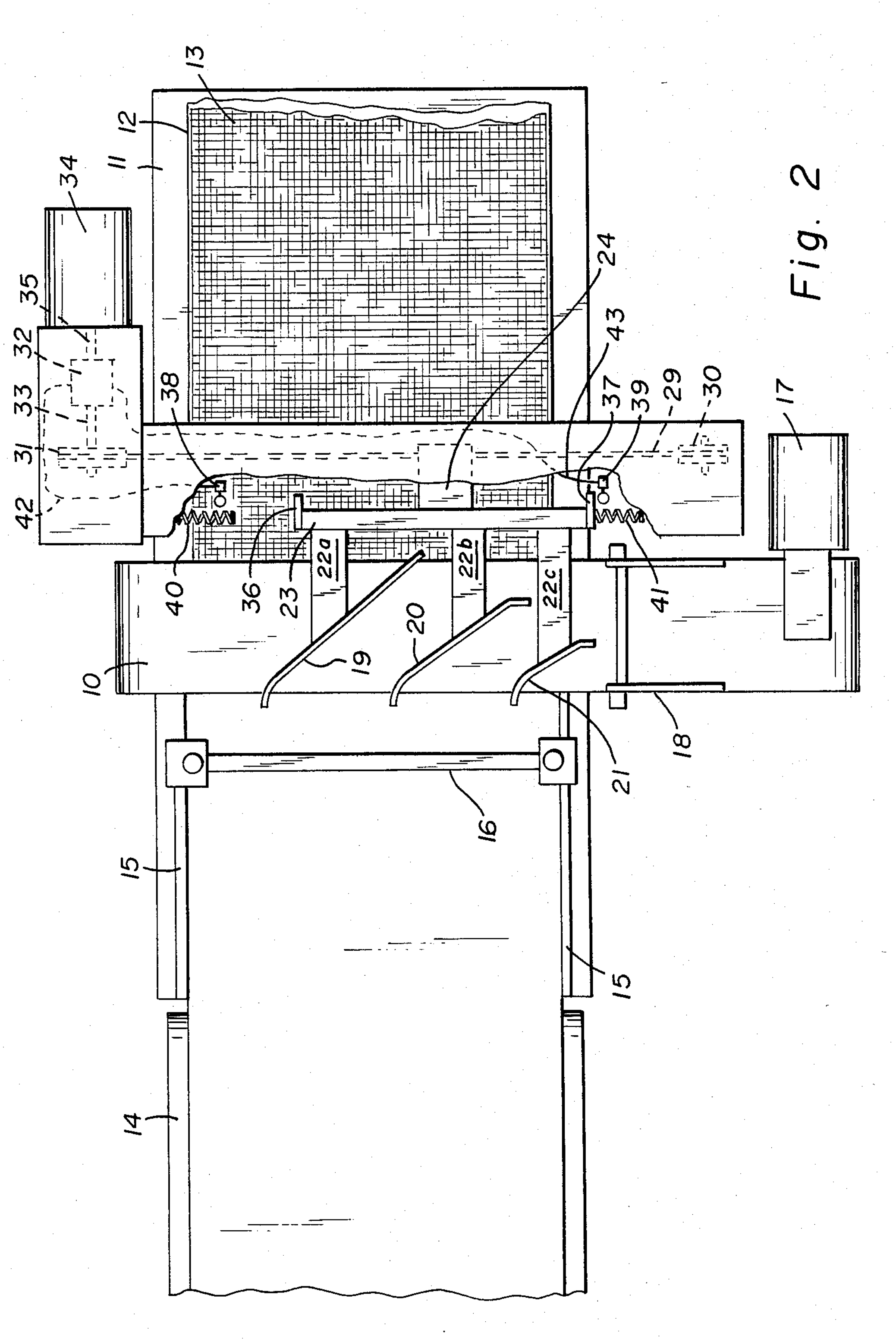
FIG. 2 is a plan view of the distribution system of FIG. 1.

In FIG. 2, a magnetic reversing clutch 32 is connected to the drive sprocket 31 by the shaft 33 and to the motor 34 by the shaft 35. Mounted at each end of the stringer 23 are the arms 36 and 37 which alternately trip the limit switches 38 and 39, respectively, in sequence to the alternating contact of the stringer 23 with the inertia reversing springs 40 and 41. The wires 42 and 43 connect the switches 38 and 39, respectively, to the reversing clutch 32.

Having observed the details of the apparatus and the system of which it is a part, attention is now given to the details of the method of this invention.

Continuous strips of the carrier sheet 12 and the scrim 13 are fed onto the conveyor belt 14, weighted down, and towed by the belt 14 under the distributor belt 10. The distributor belt 10 and the shuttle plows 19, 20 and 21 are set in motion and mortar is discharged directly onto the belt 10 by the continuous mixer 17. The belt 10 carries the mortar toward the plows at a velocity, relative to the speed and frequency of oscillation of the plows, such that there is a constant head of mortar confronting the faces of the plows. Each plow sweeps a path through the advancing mortar and deflects the mortar onto the sheet 12 and the scrim 13 as they pass under the belt 10. When the stringer 23 contacts the spring 40, energy is stored momentarily in the compressed spring before it is released to urge the mass of the plow assembly in the opposite direction. This absorption of momentum minimizes the workload on the reversing clutch 32 when it is actuated promptly thereafter by the limit switch 38 as it is contacted by the arm 36. The direction of travel of the plows is smoothly reversed. Continuous streams of mortar are laid over the breadth of the sheet 12 as the direction is reversed again when the stringer 23 and the arm 37 strike the spring 41 and the limit switch 39, respectively, and the cycle is repeated indefinitely. The layer of mortar thus distributed over the sheet 12 and the scrim 13 is a coherent mass whose surface is slightly undulatory in the machine direction but whose ridges and valleys are substantially uniform in thickness as they progress laterally across the sheet 12 and the scrim 13. As the mass of mortar is carried under the screed 16, the ridges are melded into the succeeding valleys and a flat, broad ribbon of mortar is carried downstream to the cutting knife and curing rooms.

What is claimed is:

1. An apparatus for the continuous, uniform distribution of a mortar on a moving substrate upstream from a leveling means, said apparatus comprising an endless distributor belt mounted transversely above the substrate in operative relation to a continuous mortar mixer, a plurality of shuttle plows mounted in tracking and scraping relation to the surface of the distributor belt, said plows being spaced apart along a longitudinal segment of the distributor belt and traversing successively wider paths across the distributor belt; and a means for reversing the direction of travel of the shuttle plows as a unit.

2. In the continuous production of building board which comprises depositing an aggregate-filled cementitious material on a continuous, moving substrate and conveying the mound of material under a screed to form a continuous ribbon thereof; the improvement which comprises setting in motion an endless distributor belt mounted above the substrate in transverse relation thereto, shuttling a plurality of spaced-apart, successively wider plows along the distributor belt, continuously mixing water with a hydraulic cement and an aggregate, depositing the resulting mortar on the distributor belt in confronting relation to the faces of the plows, and continuously deflecting a plurality of spaced-apart streams of the mortar off of the distributor belt and across the breadth of the substrate.

3. The apparatus of claim 1 characterized further by a mortar spreading means mounted transversely above the distributor belt upstream from the shuttle plows.

* * * * *